(12) United States Patent
Forgang et al.

(10) Patent No.: US 11,476,582 B2
(45) Date of Patent: Oct. 18, 2022

(54) TUNING SYSTEMS AND METHODS FOR DOWNHOLE ANTENNAS

(71) Applicant: Baker Hughes Oilfield Operations LLC, Houston, TX (US)

(72) Inventors: Stanislav Wilhelm Forgang, Houston, TX (US); Yi Liu, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 236 days.

(21) Appl. No.: 16/915,714

(22) Filed: Jun. 29, 2020

(65) Prior Publication Data

US 2021/0408688 A1    Dec. 30, 2021

(51) Int. Cl.
  *H01Q 9/04* (2006.01)
  *H04B 17/10* (2015.01)
  *H04B 1/04* (2006.01)

(52) U.S. Cl.
  CPC ......... *H01Q 9/0442* (2013.01); *H04B 1/0458* (2013.01); *H04B 17/103* (2015.01); *H04B 2001/0408* (2013.01)

(58) Field of Classification Search
  CPC .. H01Q 9/0442; H04B 17/103; H04B 1/0458; H04B 2001/0408
  See application file for complete search history.

(56) References Cited

U.S. PATENT DOCUMENTS

| | | | |
|---|---|---|---|
| 4,578,675 A | * | 3/1986 | MacLeod ............... E21B 47/13 340/854.6 |
| 6,600,449 B2 | | 7/2003 | Onaka et al. |
| 6,603,309 B2 | | 8/2003 | Forgang et al. |
| 6,825,659 B2 | | 11/2004 | Prammer et al. |
| 7,088,104 B2 | | 8/2006 | Bottomley |

(Continued)

FOREIGN PATENT DOCUMENTS

CN    110581741    12/2019

OTHER PUBLICATIONS

Alexey A Tyshko, "Development of Nuclear Magnetic Resonance Downhole Logging Tool for Hydrocarbones Search," VGTU leidykla Technika, 2016, pp. 1-130.

(Continued)

*Primary Examiner* — Junpeng Chen
(74) *Attorney, Agent, or Firm* — Hogan Lovells US LLP

(57) ABSTRACT

A system for downhole frequency re-tuning includes a receiver antenna, a receiver matching network, a transmitter antenna, the transmitter antenna outputting a signal that is received at the receiver antenna, a transmitter matching network, a power amplifier providing operational power to the transmitter antenna, and a frequency sweeping system. The frequency sweeping system includes an oscillator, coupled to the power amplifier, the oscillator providing an input signal to the power amplifier to adjust power output to the transmitter antenna. The system also includes a circulator, positioned between the power amplifier and the transmitter matching network, the circulator directing the operational power to the transmitter antenna. The system further includes a reflected power meter, coupled to the circulator, the reflected power meter receiving reflected power at the transmitter antenna responsive to receiver antenna. The system also includes a control module.

20 Claims, 10 Drawing Sheets

(56) References Cited

U.S. PATENT DOCUMENTS

| | | |
|---|---|---|
| 7,109,457 B2 | 9/2006 | Kinzer et al. |
| 7,482,887 B2 | 1/2009 | Cyr et al. |
| 7,602,345 B2 | 10/2009 | Chominski |
| 7,936,171 B2 | 5/2011 | Hu et al. |
| 8,000,737 B2 | 8/2011 | Caimi et al. |
| 8,368,483 B2 | 2/2013 | Fukuda et al. |
| 8,797,219 B2 | 8/2014 | Ko et al. |
| 9,069,098 B2 | 6/2015 | Hopper et al. |
| 9,133,707 B2 | 9/2015 | Prammer |
| 9,201,159 B2 | 12/2015 | Morys et al. |
| 9,506,332 B2 | 11/2016 | Saeedfar |
| 9,537,198 B2 | 1/2017 | Seneviratne et al. |
| 9,577,602 B2 | 2/2017 | Martiskainen |
| 2002/0190895 A1* | 12/2002 | Nakanishi ............... G01S 13/42 342/146 |
| 2010/0283468 A1 | 11/2010 | Signorelli et al. |
| 2012/0051189 A1 | 3/2012 | Signorelli |
| 2015/0002156 A1 | 1/2015 | Leussler et al. |
| 2015/0200568 A1 | 7/2015 | Takei |
| 2016/0141882 A1* | 5/2016 | Ichikawa ............... H02J 50/60 307/104 |
| 2016/0187521 A1 | 6/2016 | Homan et al. |
| 2018/0138992 A1 | 5/2018 | Kraft et al. |
| 2021/0359771 A1* | 11/2021 | Pyo ..................... H04B 17/103 |

OTHER PUBLICATIONS

Vishwanath Iyer, "Broadband Impedance Matching of Antenna Radiators," Worcester Polytechnic Institute, Aug. 2010, pp. 1-204.
International Search Report and Written Opinion dated Sep. 30, 2021 in corresponding PCT Application No. PCT/US21/39390.

* cited by examiner

TUNING SYSTEMS AND METHODS FOR DOWNHOLE ANTENNAS

BACKGROUND

1. Field of the Disclosure

The present disclosure relates to a system and method for tuning a tool, such as a downhole logging instruments.

2. Description of Related Art

Oil and gas production may involve downhole measurement operations where various sensors are utilized to collect data for determining one or more wellbore properties. Thus, in instruments based on electromagnetic wave propagating principles, such as in dielectric services, sets of transmitter and receiver antennas are used to generate transmit and receive signals that propagate through downhole formations while power amplifiers (PA) are used to power the transmitter antennas. Typically, the antennas had a specified operating frequency that is tuned prior to downhole deployment, such as in a lab. The extreme environments associated with wellbores may change the specified frequencies, thereby reducing transmitter power or increasing noise at the receivers.

SUMMARY

Applicant recognized the limitations with existing systems herein and conceived and developed embodiments of systems and methods, according to the present disclosure, for improved tool performance by re-tuning of frequencies for downhole tools affected by extreme logging environment.

In an embodiment, a system for downhole frequency re-tuning includes a receiver antenna, a receiver matching network, a transmitter antenna, the transmitter antenna outputting a signal that is received at the receiver antenna, a transmitter matching network, a power amplifier providing operational power to the transmitter antenna, and a frequency sweeping system. The frequency sweeping system includes an oscillator, coupled to the power amplifier, the oscillator providing an input signal to the power amplifier to adjust an operating frequency of the transmitter antenna. The system also includes a circulator, positioned between the power amplifier and the transmitter matching network, the circulator directing the operational power to the transmitter antenna. The system further includes a reflected power meter, coupled to the circulator, the reflected power meter receiving reflected power at the transmitter antenna. The system also includes a control module.

In an embodiment, a frequency sweeping system to adjust an antenna operational frequency in a wellbore includes a power amplifier, a transmitter antenna, a receiver antenna, a reflected power meter, coupled to the transmitter antenna, and a control module. The control module also includes a memory and processor, the processor receiving instructions, that when executed cause the control module to send instructions, to the swept frequency oscillator, the instructions adjusting a first operational frequency of the transmitter. The instructions also cause the control module to receive, from the reflected power meter, a reflected power value, the reflected power value transmitted from the receiver antenna to the transmitter antenna responsive to operation of the transceiver antenna at the first operational frequency. The instructions further cause the control module to determine the reflected power value is exceeds a threshold. The instructions also cause the control module to send instructions, to the receiver antenna, to adjust a second operational frequency of the receiver antenna.

In an embodiment, a method for tuning a downhole antenna includes receiving a first reflected power value, the first reflected power value indicative of operation of a transmitter antenna at a first operational frequency. The method also includes determining the first reflected power value exceeds a threshold. The method further includes sending, to a receiver matching network, a signal to adjust a second operational frequency of a receiver antenna. The method also includes receiving information acquired by the receiver antenna.

BRIEF DESCRIPTION OF DRAWINGS

The present technology will be better understood on reading the following detailed description of non-limiting embodiments thereof, and on examining the accompanying drawings, in which.

DETAILED DESCRIPTION

Figure 1:
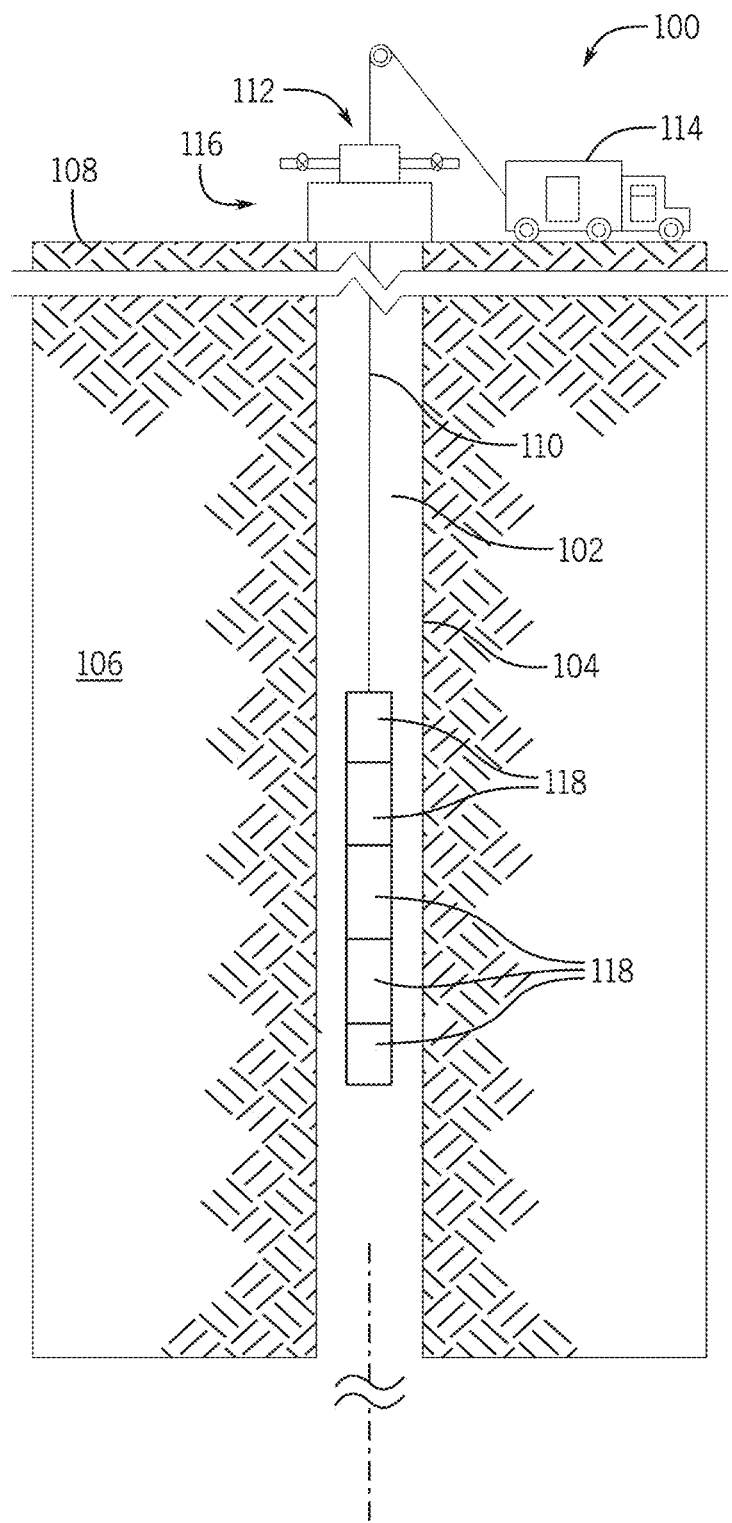
FIG. 1 is a cross-sectional side view of an embodiment of an wellbore system, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose. Additionally, references numerals may be reused for similar features between figures, however, such use is not intended to be limiting and is for convenience and illustrative purposes only.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure are directed toward systems and methods for detecting and adjusting operating conditions for a downhole tool. Specifically, embodiments may be directed toward adjusting an operating frequency for an antenna that has shifted due to different temperatures between an initial condition of the tool and a downhole operating condition of the tool. Various embodiments deploy a tool architecture that includes a hardware implementation that enables a frequency sweep to identify operating frequencies that have low reflected power levels. As a result, highly functional frequencies can be identified and utilized to re-tune components downhole. Embodiments may also incorporate look up tables or incremental adjustment based on real time or near real time (e.g., without significant delay) measurements of reflected power levels.

Embodiments, of the present disclosure are related to induction instruments used for resistivity well logging, in both wireline and logging while drilling/measurement while drilling (LWD\MDW) applications. In particular, the proposed considers the instruments incorporating a single or multiple coil arrays and operating at fixed frequencies. Using fixed frequencies has been conventional in multiple tool modifications and allows array antennas often to be tuned as resonant tanks ultimately resulting in increase of the measurement signal-to-noise ratio at a provided power.

When utilizing these tools, a common feature is that instruments have a "rigid" selection of operating frequencies resulting in elevated, often onerous, requirements to design and workmanship of the array antennas to provide for overall repeatability and temperature stability. However, deploying frequency sweeping to identify an optimal (e.g., preferred) value for an antenna may also be used. Accordingly, a tool's combined transmitter-receiver antenna would provide for maximum amplitude of irradiated transmitter magnetic field and induced receiver voltage. This method leads to increasing signal-to-noise (SNR) ratio in a few times compared to using a fixed operating frequency and not performing the tuning. The newly found frequency value then has been transmitted uphole for the data inversion and interpretation. However, these tools all suffer from problems associated with correction of acquired data. Embodiments of the present disclosure may be directed toward downhole re-tuning that accounts for various factors, such as temperature influences.

Embodiments of the present disclosure are further directed toward overcoming existing problems related with reduced transmitter signal strengths. For example, the re-tuning of frequencies might use measurements of the transmitter signal strength. Direct measurements of the transmitter strength may not be available with a sensor within the downhole tool because of noise, thus the transmitter signal is usually shielded away from electronics located inside the tool. Transmitter signal measurements with a sensor (antenna) on the tool surface could be affected by formation properties, such as conductivity. Moreover, retuning the transmitter by an additional receiver sensor mounted in proximity to transmitter antenna requires scan frequencies and stopping logging, which is generally not feasible.

FIG. 1 is a schematic cross-sectional view of an embodiment of a wellbore system 100 including a downhole tool 102 arranged within a wellbore 104 formed in a formation 106. The downhole tool 102 is lowered from a surface location 108 via a conveyance system, such as the illustrated wireline 110. In various embodiments, the electric wireline may transmit electric signals and/or energy from the surface location 108 into the wellbore, for example to provide operational power for the tool 102 and/or to transmit data, such as data obtained from sensors arranged on the tool 102. In various embodiments, the tool 102 may be utilized to perform downhole logging operations, such as an imaging tool, a resistivity tool, a nuclear magnetic resonance tool, or any other logging tool that may be used in a downhole environment. It should be appreciated that embodiments exist where the downhole tool 102 is deployed with any other type of conveyance means, including coiled tubing, pipes, cable, and slickline. That is, embodiments of the present disclosure may be utilized in other scenarios, such as measurement while drilling, production logging, and the like.

The wellbore system 100 includes a wellhead assembly 112, shown at an opening of the wellbore 104, to provide pressure control of the wellbore 104 and allow for passage of equipment into the wellbore 104, such as the cable 110 and the tool 102. In this example, the cable 110 is a wireline being spooled from a service truck 114. The wellhead assembly 112 may include a blowout preventer (BOP) 116 (e.g., pressure control device).

In various embodiments, the downhole tool 102 includes a number of segments 118, which may represent different devices or sensors utilized to obtain information from the downhole environment. By way of example only, one segment may be related to dielectric services that include one or more antennas (or antenna transmitter and receiver pairs) in order to generate transmit signals in radio frequencies and to detect signals. While these antennas may be tuned to particular frequencies (e.g., fixed frequencies) uphole, factors in the wellbore such as temperature may change the tuning to these fixed operational frequencies. As a result, power of the transmitters is reduced and/or noise increases with the receivers. This reduced power and noise may make it difficult to perform filtering without distorting the data itself. Accordingly, embodiments of the present disclosure may be directed toward downhole re-tuning of the antennas. As will be described, retuning may be performed using frequency sweeping and/or using signals reflected from the antennas.

In various embodiments, the downhole tool 102 includes a number of segments 118, which may represent different devices or sensors utilized to obtain information from the downhole environment. By way of example only, one segment may be related to dielectric services that include one or more antennas (or antenna transmitter and receiver pairs) in order to generate transmit signals in radio frequencies and to detect signals. While these antennas may be tuned to particular frequencies (e.g., fixed frequencies) uphole, factors in the wellbore such as temperature may change the tuning to these fixed operational frequencies. As a result, power of the transmitters is reduced and/or noise increases with the receivers. This reduced power and noise may make it difficult to perform filtering without distorting the data itself. Accordingly, embodiments of the present disclosure may be directed toward downhole re-tuning of the antennas. As will be described, retuning may be performed using frequency sweeping and/or using signals reflected from the antennas.

Figure 2:
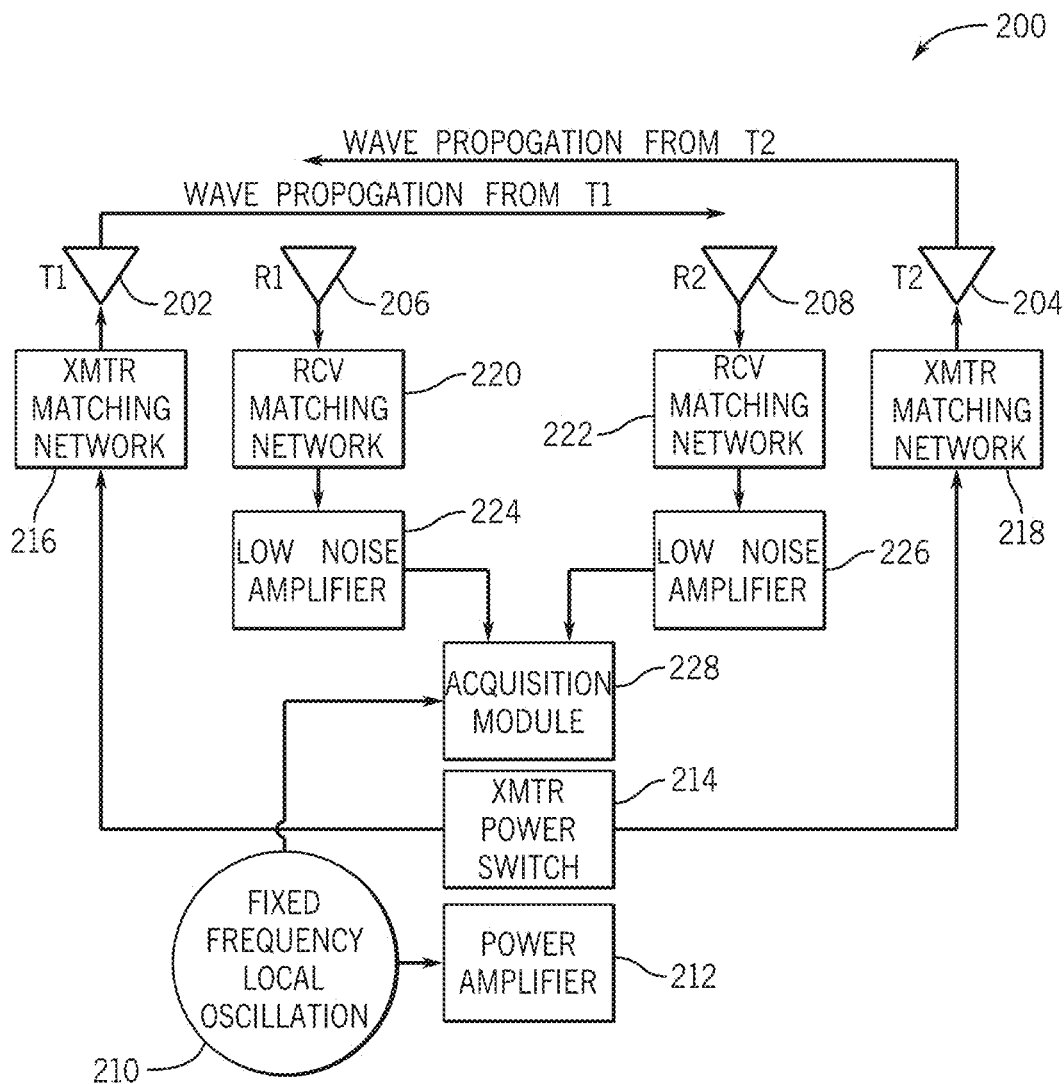
FIG. 2 is a diagram of a prior art tool architecture.

FIG. 2 is a schematic diagram of a prior art array architecture 200. A majority of conventional induction instruments operate in so-called "compensated propagation" mode. The array at its minimum contains four induction coils, typically symmetrical sets of two transmitters 202, 204 and two receivers 206, 208. The transmitter coils 202, 204 are energized sequentially by a signal of a fixed frequency local oscillator 210 amplified by a power amplifier 212. The signal is transmitted through a conducting channel of a transmitter (XMTR) power switch 214 and matching network 216, 218. It should be appreciated that matching network may include single frequency networks or multi-frequency networks. For brevity, these networks are not described in detail herein, however, examples may be found in U.S. patent application Ser. No. 16/915,491 titled "MULTI-FREQUENCY TUNING NETWORK SYSTEM AND METHOD," which is hereby incorporated by reference in its entirety. The matching network may tune the frequencies of the transmitters to enable radiation of a maximal energy electromagnetic wave while simultaneously providing for an optimum overall power distribution inside the tool by eliminating the power reflection from the antenna due to the possible antenna-power amplifier impedance mismatch.

Upon irradiation, the electromagnetic wave is propagating along the instruments and at the receivers 206, 208 it becomes attenuated and phase delayed, both due to the geometry of propagation path and properties of the environment surrounding the tool (e.g., tool body, drilling mud, formation). The signals induced in the receiver antennas 206, 208 serve as indicators of these changes in the electromagnetic wave along the path with attenuation (ratio of signal magnitudes in receivers) and phase difference between receivers as the main measurement deliverables. To improve fidelity of the received signals, the antennas 206, 208 also have respective matching impedance networks 220, 222 allowing for tuning in resonance at the operating frequency and delivering maximum signal to the front-end low noise amplifiers. The received be filtered at the low noise amplifiers 224, 226 prior to be transmitted to a data acquisition module 228, which can be an onboard module in the tool, an uphole module, or a combination thereof.

In a general case, matching networks constructed for receivers and transmitters should be identical for the same group of devices (i.e., receivers and transmitters), and different between the groups. This primarily happens due to the different signal power levels and intrinsic impedances of electronic devices and assemblies they are used in. The tool measurement results are based on relative values (two-way compensated attenuation) as an alternative to absolute amplitude measurements, on the phase difference instead of absolute phase of receiver signals. At the same time, the operating temperature remains a limitation for operation of existing tools.

Figure 3A:
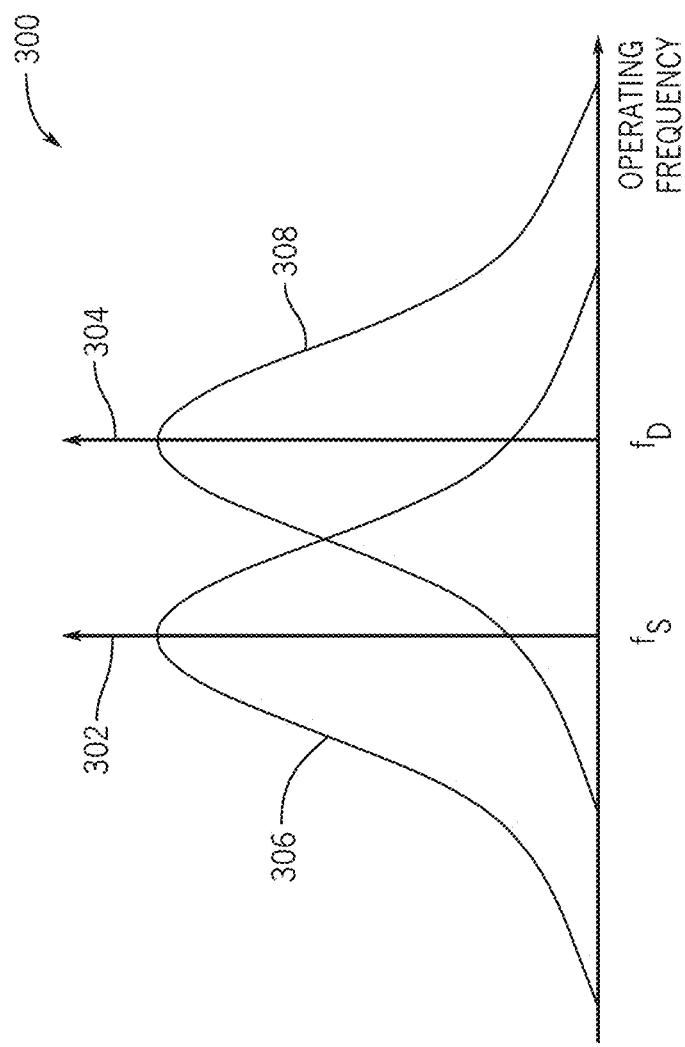
FIG. 3A is a graphical representation of an embodiment of temperature adjustment for a downhole tool, in accordance with embodiments of the present disclosure.

FIG. 3A is a graphical representation 300 of frequency shifting due to temperature changes between an initial tuning, such as an uphole environment, and operating conditions, such as a downhole environment. The tuning of both group of devices becomes compromised as their components are always subjects to temperature drifts. These drifts primarily depend on stability of mechanical and electronic components used for tool design, as tool surroundings affect the tuning noticeably less and, as usual, most likely in highly conductive environment when electromagnetic coupling effects with formation become significant. Antennas de-tuning due to temperature could cause a reduction of the useful propagation signal, which in turn results in the lowered signal-to-noise ratio after front-end electronics.

Illustrated on the graphical representation is a surface temperature frequency 302 along with a downhole temperature frequency 304. As shown, the respective curves 306, 308 (e.g., bell curves) for these frequencies 302, 304 are shifted. Accordingly, the antenna may not operate in the same manner in the downhole environment. For example, the tuned frequency may correspond to the surface temperature frequency 302, which is shifted when evaluated with respect to the downhole curve 308, thereby corresponding to a lower electrical quality. This would result in lower antenna transmitter current and efficiency of corresponding electronics as well as lower induced voltage in the receiver antenna. Such a low current may lead to the problems discussed above regarding noise and inability to filter due to lack of reliable data. Embodiments of the present disclosure are directed to overcoming this problem to provide improved data collection.

Figure 3B:
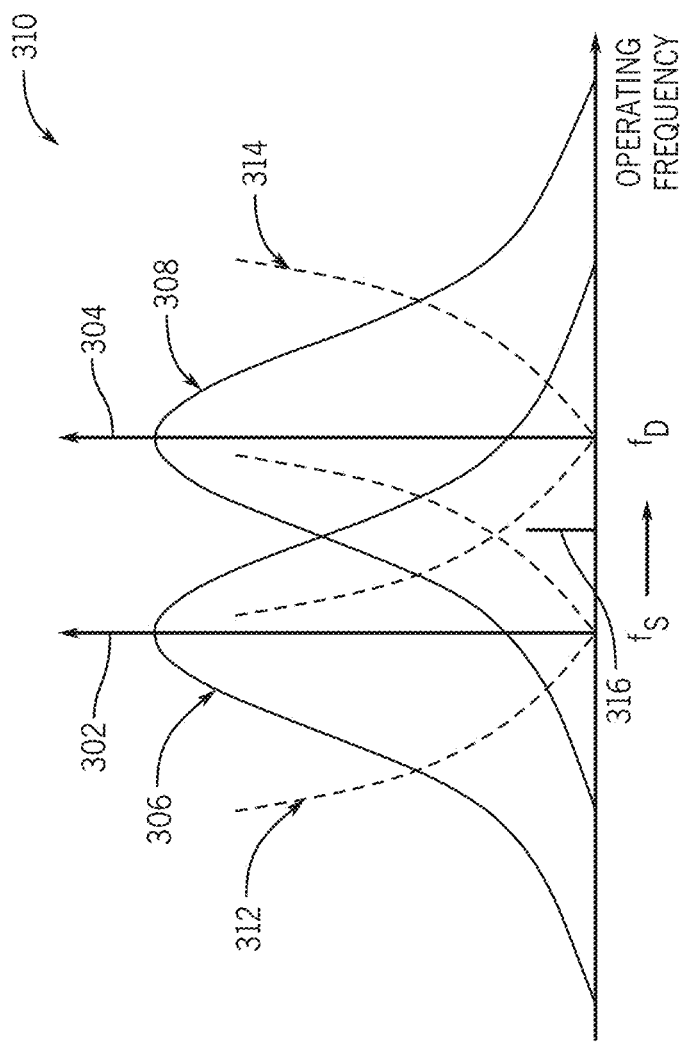
FIG. 3B is a graphical representation of an embodiment of temperature adjustment for a downhole tool with reflected power overlays, in accordance with embodiments of the present disclosure.

FIG. 3B is a graphical representation 310 of frequency shifting due to temperature changes. When compared to FIG. 3A, FIG. 3B further includes reflected power plots 312, 314 corresponding to reflected power for the surface temperature 312 and reflected power for the downhole temperature 314. As illustrated, and described below, reflected power increases as the operating frequency moves away from the tuned frequency. When reflected power increases, a greater amount of energy is returned back to the transmitter where it is dissipated in additional heat and, thereby, reducing reliable data collection at the receiver. Embodiments of the present disclosure include systems and methods for detecting and reducing the reflected power by adjusting a transmitter operating frequency to minimize the detected reflected power. In this example, a cross over location 316, at a particular frequency, is provided at an optimal region where the reflected power plots 312, 314 for each of the curves 306, 308 overlaps. As will be described below, shifting operating frequencies toward this point may enable reduced reflected power without significantly modifying parameters of the transmitter.

Figure 3C:
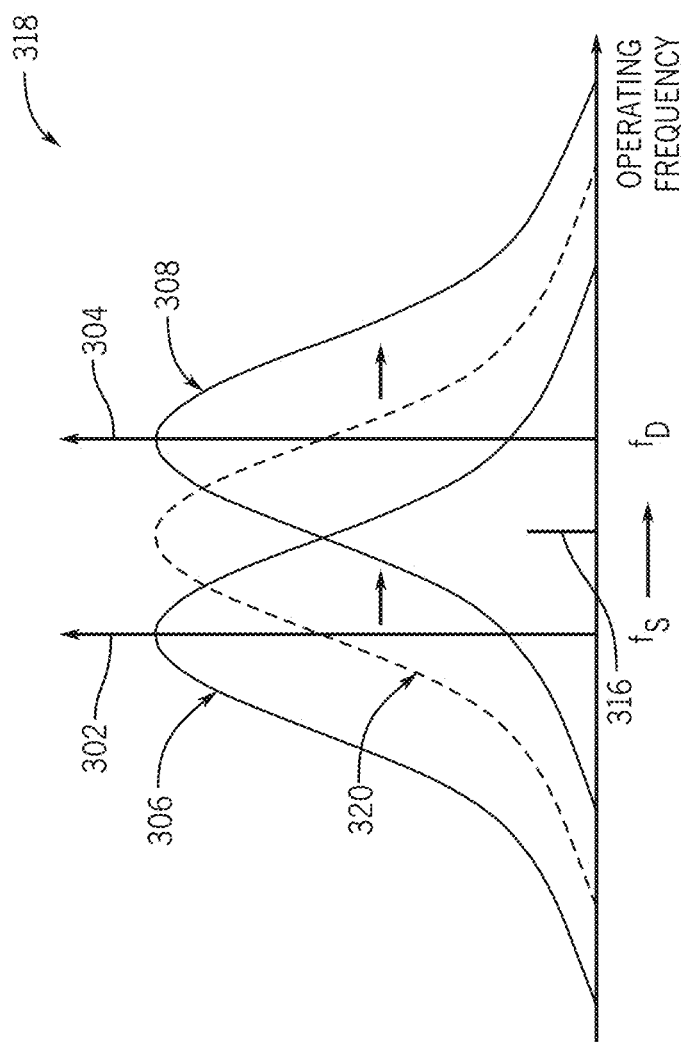
FIG. 3C is a graphical representation of an embodiment of temperature adjustment for a downhole tool with a shifted frequency adjustment, in accordance with embodiments of the present disclosure.

FIG. 3C is graphical representation 318 illustrating a shifted bull curve 320 indicative of operation at the frequency corresponding with the cross over 316. As shown, the operating frequency of the tool is shifted to the right (illustrated by the arrows). It should be appreciated that this shift may be incremental. For example, using one or more methods described herein, different frequencies may be evaluated and tested to determine an operating frequency having a reflected power below a threshold. In other words, the shifted curve 320 may correspond to a curve prior to completion of re-tuning. Furthermore, it should be appreciated that further tuning may be performed such that the components operate at the downhole frequency associated with the curve 308. That is, the illustration in FIG. 3C is just an example of shifting operational frequencies in response to the tool's reaction to temperatures in the downhole environment.

Figure 4:
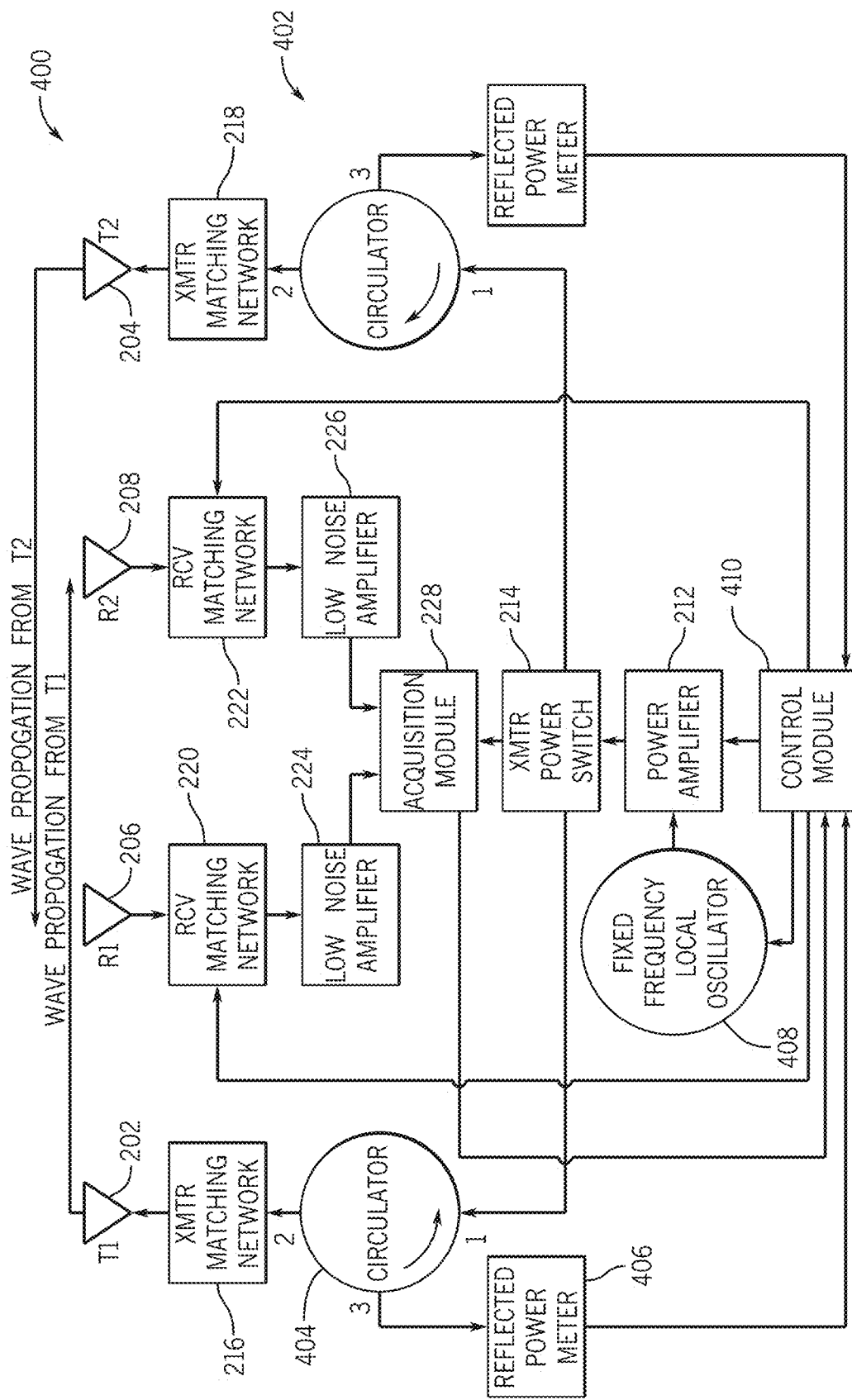
FIG. 4 is a diagram of an embodiment of a tool architecture, in accordance with embodiments of the present disclosure.

FIG. 4 is an array architecture 400 including a sweeping hardware implementation 402 that may be utilized to tuning different transmitter and receiver antenna pairs. The illustrated architecture 400, when compared to FIG. 2, shares several components such as the transmitters 202, 204, the receivers 206, 208, the power amplifier 212, the power switch 214, the matching networks 216, 218, 220, 222, the filters 224, 226, and the acquisition module 228. Accordingly, it should be appreciated that embodiments may be incorporated into existing systems to improve their operation. Additionally, it should be appreciated that embodiments of the hardware implementation 402 may be a single component that is coupled to existing components or may be formed from multiple components positioned at various locations within the tool.

Embodiments of the present disclosure include multiple components to facilitate identification of an operable frequency and tuning of the components to the frequency. For example, the illustrated embodiment includes a circulator 404, a reflected power meter 406, a swept frequency local oscillator 408, and a control module 410. Operation of these components is described herein along with a multi-step process for tuning the transmitter and receiver antenna pairs.

In operation, the transmitters 202, 204 may be a high voltage\high current\high power module that could utilize a dedicated ultra-stable hardware for re-tuning. Therefore, adjusting the transmitter operating frequency to find a maximum in antenna response (resonance) is a preferable approach. Such tuning may be accomplished by either finding a minimum in the antenna's reflected power or by detecting a maximum in the individual (even pre-tuned) receiver signal. Upon completion, the updated value of an operating frequency could be sent uphole and\or saved in on-board tool memory for use in the acquired data processing.

As noted above, the hardware implementation 402 includes the additional modules when compared to FIG. 2. For example, the fixed frequency local oscillator is replaced with the illustrated sweep frequency local oscillator 408. The swept frequency local oscillator is operable under control of the control module 410 and includes an outlet signal that is transmitted to the power amplifier 212. In response, the power amplifier 212 may transmit energy, through the switch 214, to the circulators 404. As will be appreciated, the circulator 404 corresponds to a passive, non-reciprocal three-port device, in which a radio-frequency signal enters any port and is transmitted to the next port in rotation. In this example, the ports are labeled 1, 2, 3. As a result, a power signal may be transmitted to port 1 and then output through port 2 to supply energy to the transmitter 202. However, reflected power from the transmitter 202 (responsive to mismatched operation with the receiver 206) is then directed through port 3, which couples to the reflected power meter 406. As illustrated, the reflected power meter 406 provides a control signal as an input to the control module 410 for selecting parameters of the swept frequency local oscillator 408. As will be appreciated, the reflected power meter may measure a reflected wave that is responsive to the receiver antenna 206 being mismatched with the transmitter 202. When that reflected power exceeds a predetermined value, the control module 410 may be utilized to adjust one or more operating parameters of the system, as will be described below.

As noted above, it may be more challenging to tune the transmitters 202, 204 than the receivers 206, 208. Accordingly, responsive to a reflected power measurement that exceeds a predetermined threshold, the control module 410 may transmit a tuning signal to the matching networks 220, 222. In this manner, a new operating frequency may be established, for example, based on advantageous operation of the transmitter. Because receivers 206, 208 often operate with small amplitude signals, adjustments to operating frequencies may be accomplished by direct change of the matching network parameters. These parameters may then be tested by evaluating output signals received at the acquisition module 228. As illustrated, the acquisition module 228 is communicatively coupled to the control module 410 such that the output signals from the receivers 206, 208 may be received and evaluated by the control module 410. In certain embodiments, responsive to the output of the acquisition module 228, the control module 410 provides a respective signal to one or more sensitive elements in RCV matching networks 216, 218. These sensitive elements of RCV matching network 216, 218 could be built using high frequency\high temperature hyperabrupt varactors, as one example embodiment.

Accordingly, embodiments of the present disclosure may identify and select operating frequencies for the transmitters and/or receivers by performing the above-described frequency sweep. An initial operation signal is transmitted to the transmitters 202, 204 to identify a reflected power level, indicative of a mismatch between the transmitters 202, 204 and the receivers 206, 208. It should be appreciated that multiple different power signals may be transmitted in order to identify a greatest or highest operating frequency. Thereafter, the remaining tool components (e.g., transmitters and/or receivers) may be tuned to operate at that frequency in a master/slave relationship, where identification of a high operating frequency drives selection of the frequency for a related component. In various embodiments, the matching networks 216, 218, 220, 222 may be utilized to tune the operating frequencies of the illustrated transmitters 202, 204 and receivers 206, 208. In this manner, the transmitters 202, 204 may operate with a reflected power lower than a threshold, thereby providing an improved signal. Moreover, the receivers 206, 208 may operate at a matched frequency, thereby providing improved data collection, which may also reduce noise within the system.

Figure 5:
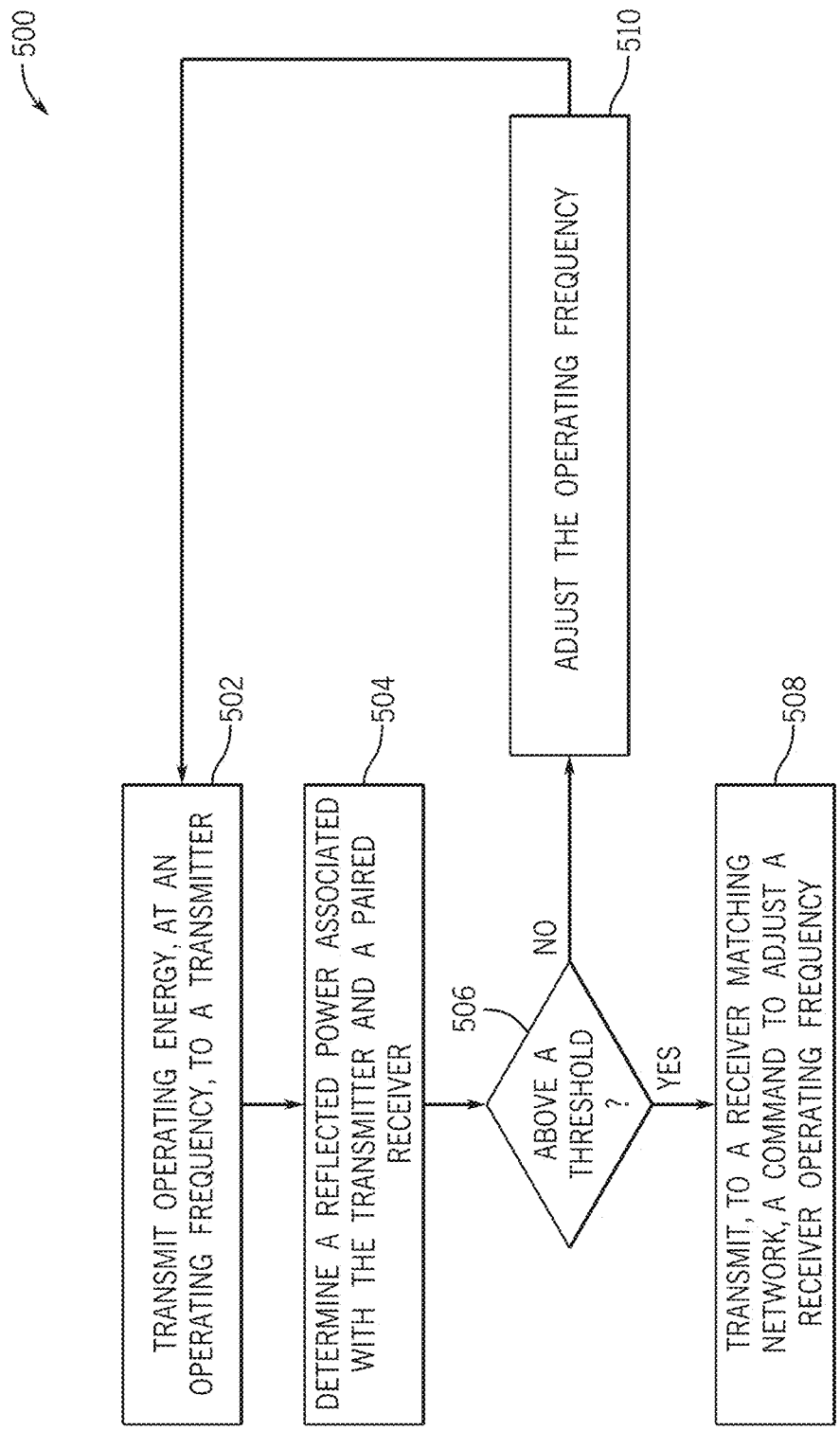
FIG. 5 is a flow chart of an embodiment of a method for adjusting a downhole tool operating frequency, in accordance with embodiments of the present disclosure.

FIG. 5 is a flow chart of an embodiment of a method 500 for adjusting an operating frequency for one or more downhole components, such as antennas. It should be appreciated that this method, and all methods described herein, may include more or fewer steps. Additionally, the steps may be performed in parallel or a different order unless otherwise specifically stated. In this example, operational energy is sent to a transmitter 502. The operational energy is provided at a particular frequency that enables transmission of a signal from the transmitter that is received by a paired or associated receiver. Reflected power for the transmitter is determined 504. As noted above, the reflected power may be a product of a mismatch of frequencies between the transmitter and the receiver. This measured reflected power is then compared against a threshold 506. It should be appreciated that the threshold may be particularly selected for different operating conditions. For example, the threshold may be a percentage and may vary for high or low frequencies. If the reflected power exceeds the threshold, the operating frequency is transmitted to a matching network, associated with the receiver, to adjust a receiver operating frequency 508. If the reflected power does not exceeds the threshold, the operating frequency for the transmitter is adjusted 508 and different frequencies may be evaluated. In this manner, a frequency sweep may be performed where the transmitter is tested at a variety of different frequencies and, once a frequency having a reflected power level below a desired level is identified, the receiver may be tuned to operate at this frequency. Accordingly, the downhole tool may operate at an identified beneficial or high frequency to provide sufficient power output for signal reception at the receiver.

In various embodiments of the present disclosure, frequency tuning may also be performed by using an antenna's reflected signal while monitoring a reflected scattering parameter. For a given transmitter driver power, the transmitter antenna's reflection parameter reflects the antenna's signal strength at frequencies near their peaks. Thus, the return signal describes performance changes due to thermal shift of electronic components and environmental changes such as downhole formation conductivity.

Figure 6:
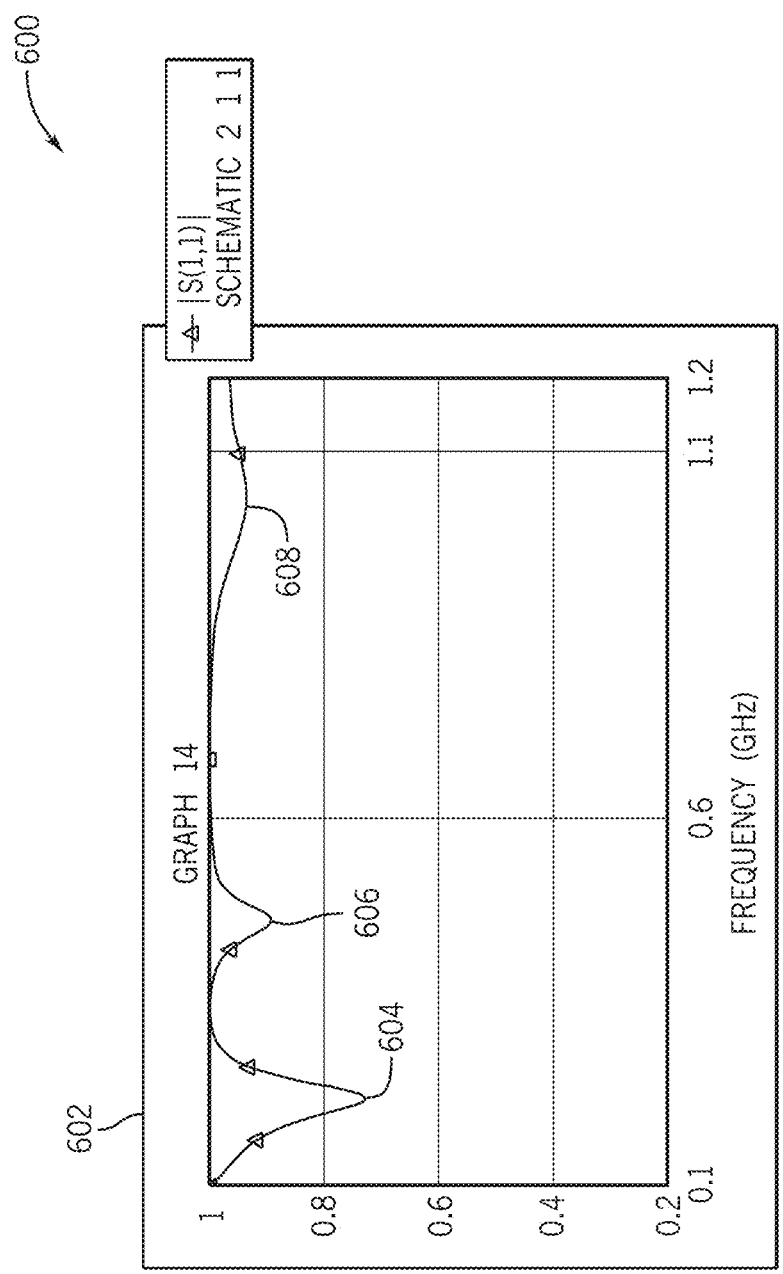
FIG. 6 is a graphical representation of a downhole tool spectra, in accordance with embodiments of the present disclosure.

FIG. 6 is a graphical representation 600 of a spectra 602 of a transmitter antenna radiation. As shown, the spectra 602 includes various dips 604, 606, 608 indicative of designed operating frequencies. In other words, the dips 604, 606, 608 are frequencies that are particularly selected for operation associated with the antenna. Accordingly, it is desirable to operate the tool at frequencies near these dips 604, 606, 608.

Figure 7:
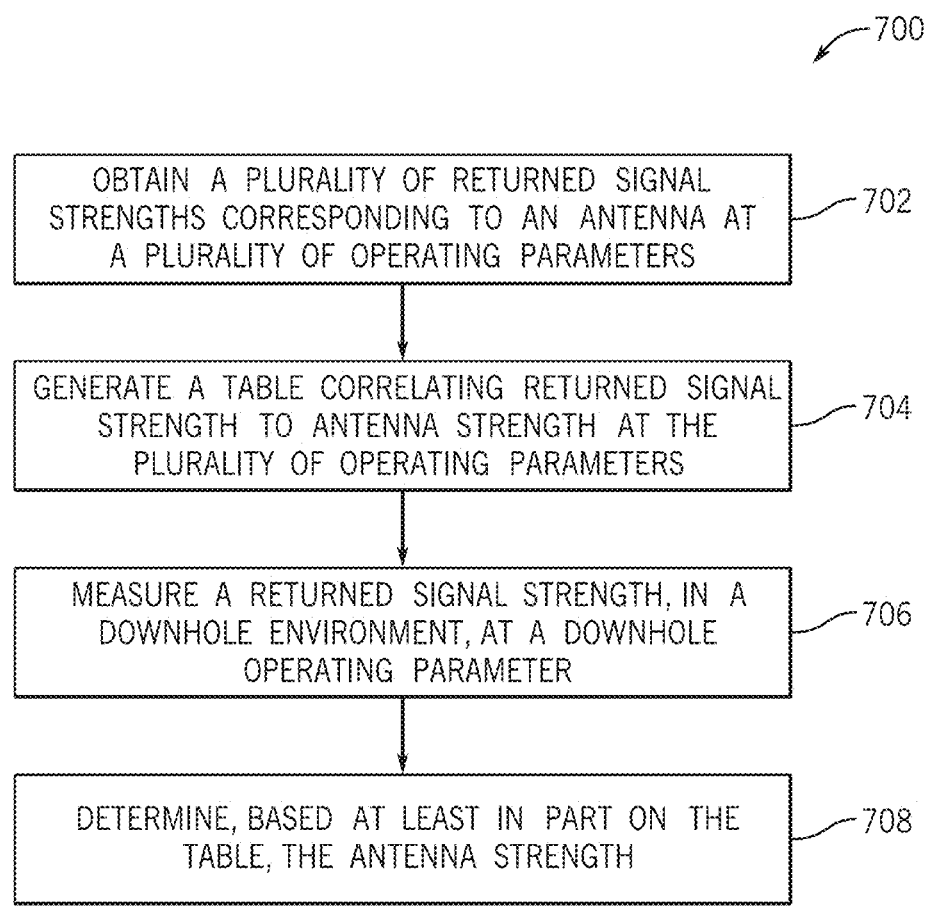
FIG. 7 is a flow chart of an embodiment of a method for adjusting a downhole tool operating frequency, in accordance with embodiments of the present disclosure.

FIG. 7 is a flow chart of a method 700 for selecting an operating frequency for a downhole tool. In this example, a tool is evaluated to determine a plurality of returned signal strengths corresponding to an antenna at a plurality of operating parameters 702. In various embodiments, the antenna may be in laboratory conditions where the returned signal strength is obtained for different parameters such as frequency, temperature, and the like. A table may be generated from the data 704. As a result, a lookup table may be established to correlate antenna signal strength to the returned signal strength. The tool may be utilized in a downhole environment, where a downhole returned signal strength is measured 706. This downhole returned signal strength may be used, in combination with the lookup table, in order to determine the antenna strength 708. This information may enable adjustments to the antenna in order to improve signal strength.

Figure 8:
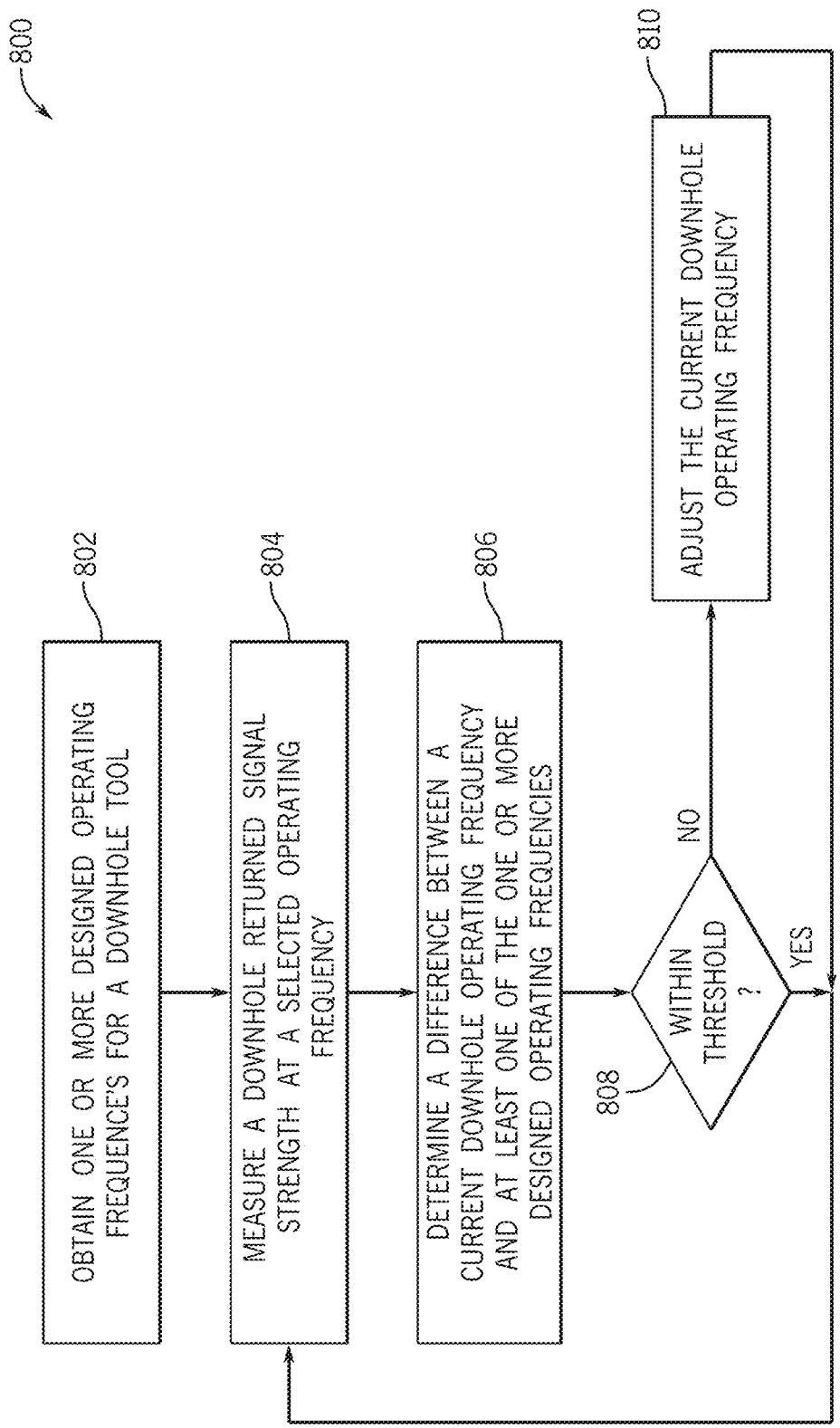
FIG. 8 is a flow chart of an embodiment of a method for adjusting a downhole tool operating frequency, in accordance with embodiments of the present disclosure.

FIG. 8 is a flow chart of a method 800 for re-tuning frequencies based on real time monitoring of a spectra, such as the spectra of FIG. 6. Under normal operating conditions, the tool operates near the dips, as described above. In this example, one or more designed operating frequencies are obtained 802. For example, the tool may include memory that includes preloaded information regarding the configuration of the tool. Additionally, in embodiments, the tool is communicatively coupled to an uphole control system that may transmit information downhole to the tool. In various embodiments, measurements are obtained for returned signal strength 804. The measurements may be continuous, streaming measurements or periodic measurements. A difference between a current downhole operating frequency and the designated operating frequency is determined 806. In various embodiments, the tool may include a variety of different potential frequencies, and as a result, the difference may be evaluated with respect to the closest designed frequency. A determination is made whether the current frequency is within a threshold amount of the designed frequency 808. If not, the current frequency may be adjusted 810. In this manner, the tool may be continuously monitored and adjusted. Thus, instead of scanning the frequency in a wide range, the frequency could be shifted in small steps, which enables operating frequencies with the best transmitter signal levels for new environmental conditions. For example, as a wellbore depth changes.

The foregoing disclosure and description of the disclosed embodiments is illustrative and explanatory of various embodiments of the present disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for downhole frequency re-tuning, comprising:
    a receiver antenna;
    a receiver matching network;
    a transmitter antenna, the transmitter antenna outputting a signal that is received at the receiver antenna;
    a transmitter matching network;
    a power amplifier providing operational power to the transmitter antenna; and
    a frequency sweeping system, comprising:
        an oscillator, coupled to the power amplifier, the oscillator providing an input signal to the power amplifier to adjust an operating frequency of the transmitter antenna;
        a circulator, positioned between the power amplifier and the transmitter matching network, the circulator directing the operational power to the transmitter antenna;
        a reflected power meter, coupled to the circulator, the reflected power meter receiving reflected power at the transmitter antenna; and
        a control module.

2. The system of claim 1, wherein the circulator is a 3-port circulator that receives the operational power at a first port, directs the operational power to the transmitter antenna at a second port, receives the reflected power at the second port, and directs the reflected power to the reflected power meter at a third port.

3. The system of claim 1, wherein the control module, responsive to a determination that the reflected power at the reflected power meter exceeds a threshold, adjusts operation of the oscillator.

4. The system of claim 1, wherein the control module, responsive to a selection of a transmitter operational frequency, transmits a command to the receiver matching network to adjust a receiver operational frequency.

5. The system of claim 1, further comprising:
    an acquisition module, coupled to the receiver antenna, the acquisition module transmitting information to the control module, wherein data received by the receiver antenna is evaluated to determine whether a receiver operational frequency matches a transmitter operational frequency.

6. The system of claim 1, further comprising:
    a downhole tool positioned within a wellbore, wherein the frequency sweeping system is operable to adjust respective operational frequencies of at least one of the receiver antenna or the transmitter antenna while the downhole tool is within the wellbore.

7. A frequency sweeping system to adjust an antenna operational frequency in a wellbore, comprising:
    a power amplifier;
    a transmitter antenna;
    a receiver antenna;
    a reflected power meter, coupled to the transmitter antenna; and
    a control module, wherein the control module includes a memory and processor, the processor receiving instructions, that when executed cause the control module to:
        send instructions, to the power amplifier, the instructions adjusting a first operational frequency of the transmitter;

receive, from the reflected power meter, a reflected power value, the reflected power value transmitted from the receiver antenna to the transmitter antenna responsive to operation of the transceiver antenna at the first operational frequency;

determine the reflected power value is exceeds a threshold; and send instructions, to the receiver antenna, to adjust a second operational frequency of the receiver antenna.

8. The system of claim 7, further comprising:

a transmitter matching network, coupled to the transmitter antenna; and a receiver matching network, coupled to the transmitter antenna;

wherein the instructions to adjust the second operational frequency are transmitted to the receiver matching network, the instructions matching an impedance of the receiver antenna to an impedance of the transmitter antenna.

9. The system of claim 7, wherein the instructions, when executed, further cause the control module to:

determine the reflected power value is below the threshold; and send instructions, to a swept frequency oscillator, to maintain the first operational frequency of the transmitter.

10. The system of claim 7, further comprising:

an acquisition module, coupled to the receiver antenna, the acquisition module receiving information, from the receiver antenna, indicative of one or more wellbore properties.

11. The system of claim 10, wherein the instructions, when executed, further cause the control module to:

receive the information from the acquisition module, the information being evaluated to determine whether the transmitter antenna and the receiver antenna are matched.

12. The system of claim 7, wherein the first operational frequency is particularly selected, based at least in part on one or more designed operating frequencies.

13. The system of claim 7, wherein the adjustment to the first operational frequency is an incremental adjustment, based at least in part on a table indicative of antenna drift responsive to a temperature change.

14. The system of claim 7, wherein operation of the control module is responsive to a temperature change between an initial configuration and a wellbore configuration, the initial configuration corresponding to operation instructions prior to installation within the wellbore.

15. A method for tuning a downhole antenna, comprising:

receiving a first reflected power value, the first reflected power value indicative of operation of a transmitter antenna at a first operational frequency;

determining the first reflected power value exceeds a threshold;

sending, to a receiver matching network, a signal to adjust a second operational frequency of a receiver antenna; and receiving information acquired by the receiver antenna.

16. The method of claim 15, further comprising:

determining a power level for the information;

sending, to the transmitter antenna, instructions to adjust operation to a third operational frequency;

receiving a second reflected power value, the second reflected power value indicative of operation of the transmitter antenna at the second operational frequency;

determining the second reflected power value exceeds the threshold;

sending, to the receiver matching network, a second signal to adjust a fourth operational frequency of the receiver antenna;

receiving information acquired by the receiver antenna; and determining a second power level for the information is greater than a first power level.

17. The method of claim 16, wherein the adjustment to the third operational frequency is an incremental adjustment, based at least in part on a table indicative of antenna drift responsive to a temperature change.

18. The method of claim 15, wherein the first operational frequency is particularly selected, based at least in part on one or more designed operating frequencies.

19. The method claim 15, where antenna tuning is performed while a downhole tool including both the transmitter antenna and the receiver antenna is arranged within a wellbore.

20. The method of claim 15, further comprising:

sending, to the transmitter antenna, instructions to adjust operation to a plurality of operational frequencies, the plurality of operational frequencies sweeping a set of operational frequencies over a range.

* * * * *